Dec. 1, 1925.                                           1,563,609

O. ZERK NOW BY JUDICIAL CHANGE OF NAME O. U. ZERK
LUBRICATING APPARATUS
Filed March 14, 1921

INVENTOR
Oscar Zerk,
By Baker & Macklin,
ATTORNEYS

Patented Dec. 1, 1925.

1,563,609

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

LUBRICATING APPARATUS.

Application filed March 14, 1921. Serial No. 452,125.

*To all whom it may concern:*

Be it known that I, OSCAR ZERK, now by judicial change of name OSCAR ULYSSES ZERK, a citizen of the Republic of Czechoslovakia, residing at Cleveland, in the county of Cuyahoga and State of Ohio, have invented a certain new and useful Improvement in Lubricating Apparatus, of which the following is a full, clear, and exact description, reference being had to the accompanying drawings.

My invention relates to a lubricating apparatus. One of the objects of the invention is to provide such an apparatus adapted to maintain lubricant under pressure whereby it may be readily delivered to any desired point by the simple act of coupling a conduit and opening a valve.

Another object of the device is the provision of a portable pressure tank equipped with the necessary valves and conduit, all of which shall be simple and inexpensive to manufacture and at the same time shall be durable and efficient.

Other objects will be apparent in the course of the following description and claims.

Figure 1:
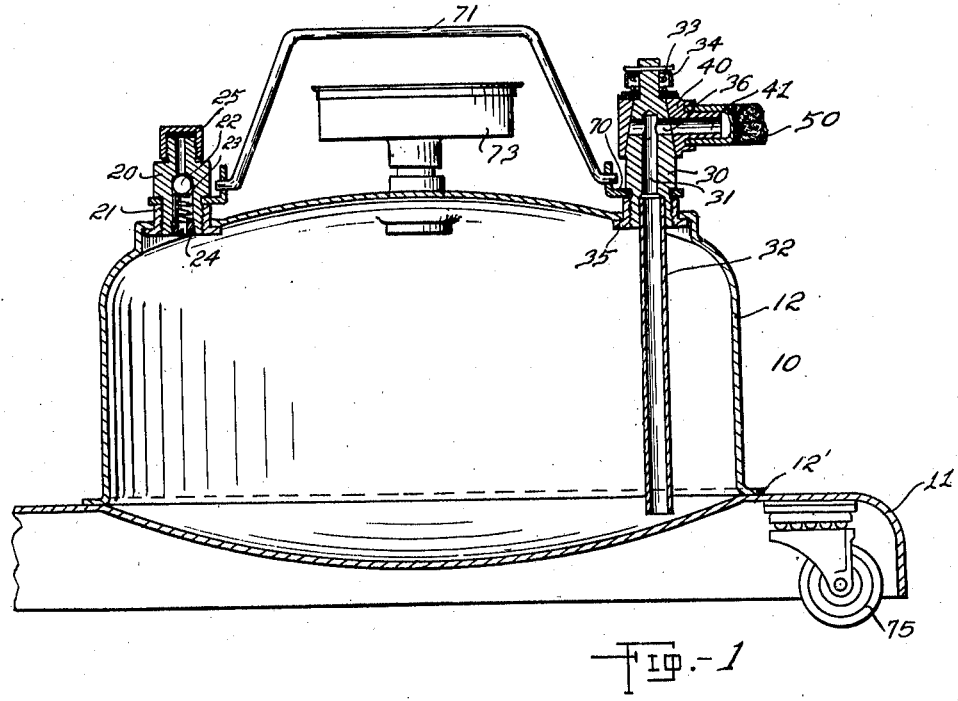
Figure 2:
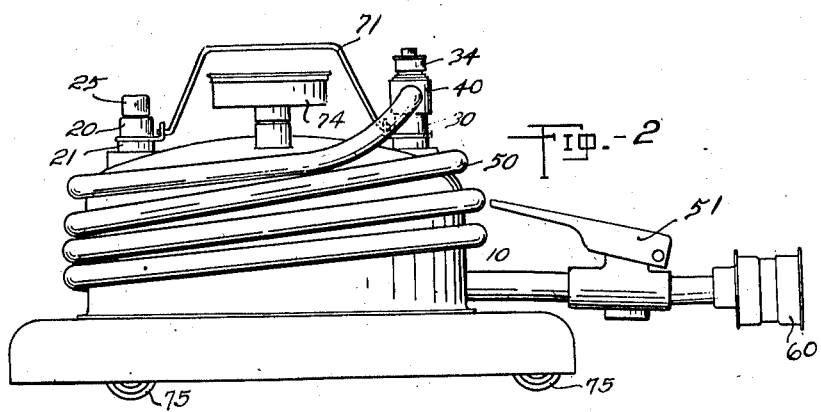
Figure 3:
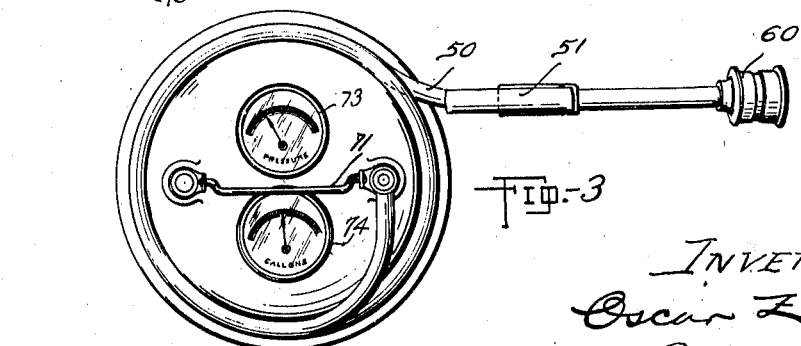

Referring to the drawing, in which a device embodying the principles of my invention is illustrated, Fig. 1 is a vertical central section of my device; Fig. 2 is a side view of the same on a reduced scale, and Fig. 3 is a top plan view on a still smaller scale.

Referring to the parts by reference numerals, the pressure tank 10 is shown as comprising the base 11 and the dome 12. This dome may be formed with the outwardly extending flange 12' adapted to be welded or otherwise secured to the base 11 to form a tank. This tank is adapted to contain liquid lubricant under pressure and to deliver such material to the desired point. It is also provided with means whereby it is rendered portable.

With these ends in view, I show the top of the dome as provided with openings which may respectively carry an inlet valve, and an outlet connection.

The inlet opening may have welded or otherwise secured therein, the boss or bushing 21 in which is threaded the plug 20. Mounted within the plug 20 is a valve, shown in the form of a ball valve 22, held in position by means of the spring 23, which abuts a small bushing or plug 24 threaded into the inner end of the plug 20. This valve being adapted to allow inlet of air into the tank but to prevent its escape. A suitable cap 25 may be provided for closing the outer end of the plug 20 to protect it when not in use.

Diametrically opposite from the opening just described is another opening receiving a similar bushing 35 and plug 30, which latter has a longitudinally extending opening 31 which communicates with an aligned piping 32 suitably secured in the plug and extending downward adjacent the bottom of the tank. Adjacent its upper portion the plug is made conical in form to seat within a similarly shaped opening in the socket member 40. A spring 33, bearing on one end against the collar 34, held in position by a pin passing through the upper reduced portion of the plug 30 and bearing on its other end against washers on the socket member 40, serves to retain these members in tight fitting position.

Transverse openings 36 in the plug communicate with the longitudinal opening and are adapted to register with the opening 41 in the socket member in certain positions of this member, whereby these members form a valve, or turn cock, which may be opened and closed by giving substantially a quarter turn to the socket 40.

Suitably attached to the socket member is a flexible tubing 50, which may be provided with a valve 51, placed preferably close to a gripping means 60 so that the operator may attach the member 60 to a grease or oil nipple and manipulate the valve with the same hand. This valve is adapted to be normally held in closed position, but is operable to allow communication thru the tube to the gripping means 60.

This member 60 may be any well known form of a self-sealing connecting member.

The two openings adjacent the center of the top of the tank 10 may be provided to allow attachment respectively of a pressure gauge 73, and a contents gauge 74, each of which may be threaded in a bushing 72 which may be secured in these openings in the tank in the same manner as the other bushings 21 and 35 are secured in their openings. In order to provide a convenient means for moving my pressure tank from place to place, I have shown the brackets 70 retained between the plugs 20 and 30 and their respective bosses, and having ears to receive the end of the bail or handle 71, while the tank may be furnished with the castors 75 suitably swivelled on the base 11. If desired a transparent oil level gauge similar to the water level gauges ordinarily used on a steam boiler may be provided on the side of the tank.

The operation of the device is as follows:—

After the lubricant has been inserted in the tank through any of the openings, or through a special filling opening if desired, the cap 25 is removed and the nipple of the plug 20 attached to a suitable source of pressure, and air, or other gas, forced into the tank to create a driving pressure therein. The coupling 60 may be then attached to an oil nipple or the like and upon manipulation of the valve 51 lubricant may now be forced thru the tubing to the desired point. The location of the valve 51 close to coupling 60 enables the operator to simultaneously grasp the coupling and valve in his hand so as to perform both operations without moving his hand along the tube. The valve adjacent the tank also provides means for cutting off the communication at this point.

It will be seen that the hose 50 may be conveniently disposed of when out of use by wrapping it around the tank, as shown in Figs. 2 and 3, and that when so placed it will pull the socket member 40 to the cut off position to prevent flow of lubricant from the tank. The valve 51 is placed adjacent the coupling 60 so that when lubricant is being supplied to a source distant from the tank, the operator may have full control of the delivery thereof without having to return to the tank. This arrangement makes for instance the delivery of lubricant to oil cups of an automobile very easy. Thus it will be seen that the valve 51 may be opened by the operator, when the coupling is connected to an oil cup placed underneath the body of an automobile, and while the operator is also underneath the body. In other words, wherever the cup or part to which lubricant is to be delivered is situated, the operator will have full control at this point of the delivery of oil through the hose.

It is apparent that many other forms of device embodying the principles of my invention may be made, and therefore the foregoing description is to be taken as illustrative and not restrictive.

Having thus described my invention, I claim:

1. In a lubricating apparatus, a cylindrical tank having openings in one end, bushings extending through said openings and carried by said end, a plug threaded in each of said bushings, and a member surrounding each of said plugs and seated between a shoulder on said plug and the end of the bushing, and having an upturned eyelet and a bail having its ends inserted into said eyelets.

2. In a lubricating apparatus, a cylindrical tank having openings in its cover, bushings extending through said openings and carried by said cover, a valve plug threaded in each of said bushings, and a member surrounding each of said plugs and seated between a shoulder on said plug and the end of the bushing, and having an upturned eyelet, and a bail having its ends inserted into said eyelets.

3. Lubricant dispensing means comprising a container adapted to withstand internal pressure, means for filling said tank partly with liquid and partly with expansive pressure fluid, a flexible conductor, a swivel valve and coupling connecting said conductor to the liquid in the bottom of said container, a detachable coupling at the free end of said flexible conductor, a second manually controlled valve adjacent said detachable coupling, and a support for said container projecting annularly to form a shelf to receive said flexible conductor when coiled, said valve coupling closing the connection when said conductor is coiled around said container.

4. Lubricant dispensing means comprising a container adapted to withstand internal pressure, means for filling said tank partly with liquid and partly with expansive pressure fluid, a flexible conductor, a swivel coupling connecting said conductor to the liquid in the bottom of said container, a detachable coupling at the free end of said flexible conductor, a manually controlled valve adjacent said detachable coupling, and a support for said container projecting annularly to form a shelf to receive said flexible conductor when coiled.

5. Lubricant dispensing means comprising a container adapted to withstand internal pressure, means for filling said tank partly with liquid and partly with expansive pressure fluid, a flexible conductor, a swivel valve and coupling connecting said conductor to the liquid in the bottom of said container, a detachable coupling at the free end of said flexible conductor, and a second manually controlled valve adjacent said detachable coupling, said valve coupling closing the connection when said conductor is coiled around said container.

6. Lubricant dispensing means comprising a container adapted to withstand internal pressure, means for filling said tank partly with liquid and partly with expansive pressure fluid, a flexible conductor, and a support for said container projecting annularly to form a shelf to receive said flexible conductor when coiled.

7. Lubricant dispensing means comprising a container with a dome shaped top, an inlet and an outlet in said top on opposite sides of the center thereof, a pressure gauge and a contents gauge in said top on opposite sides of the center thereof and on a line perpendicular to a line through said inlet and outlet, and a bail member fastened at its ends to said inlet and outlet and extending across the center between said gauges.

8. Lubricant dispensing means comprising a container with a dome shaped top, an inlet and an outlet in said top on opposite sides of the center thereof, and a bail member fastened at its ends to said inlet and outlet and extending across the center.

In testimony whereof, I hereunto affix my signature.

OSCAR ZERK,
*Now by judicial change of name Oscar Ulysses Zerk.*